INVENTORS
Charles C. Robinson
Elias Snitzer

3,664,725
Patented May 23, 1972

3,664,725
PHOTOCHROMIC GLASS
Charles C. Robinson, Sturbridge, and Elias Snitzer, Wellesley, Mass., assignors to American Optical Corporation, Southbridge, Mass.
Continuation-in-part of application Ser. No. 842,794, June 30, 1969, which is a continuation-in-part of application Ser. No. 490,918, Sept. 28, 1965. This application Oct. 30, 1970, Ser. No. 85,677
Int. Cl. G02f 1/28, 1/36
U.S. Cl. 350—160 P
12 Claims

ABSTRACT OF THE DISCLOSURE

A device for controlling the transmission characteristics of a stream of light comprising a means for introducing a stream of light to be controlled, a rare earth doped host glass having rare earth ions which exhibit excited state absorption at a wavelength corresponding to the wavelength of the stream of light to be controlled and a means for pumping the ions to an excited state for control of the stream of light by absorption as the light is transmitted through the device.

CROSS-REFERENCES TO RELATED APPLICATIONS

This application is a continuation-in-part of application Ser. No. 842,794, filed June 30, 1969, now abandoned which is a continuation-in-part of application Ser. No. 490,918, filed Sept. 28, 1965, now abandoned.

BACKGROUND OF THE INVENTION

For so-called photochromic materials, the changes in absorption characteristics either increase or decrease at various wavelengths in the material. Examples of these materials are uranyl glass and copper glass, which increase in absorption as a result of optical pumping with a xenon flash tube. The excited state absorptions in these glasses are broad and are not confined to a narrow band as would be extremely desirable for many applications. Glasses such as uranyl and copper are pumped with light in the ultra-violet and visibile regions with the lifetime of the excited state absorption being approximately 0.5 millisecond for uranyl glass and one minute for copper glass.

SUMMARY OF THE INVENTION

According to the present invention, the rare earth doped glasses described herein are pumped primarily at wavelengths in the near infra-red region of the wavelength spectrum and the absorption effects have a lifetime in the order of 15 milliseconds. In one embodiment of the invention, a narrow excited state absorption band for erbium glass appears in the vicinity of 0.479 µm. and overlaps the 0.476 µm. argon ion laser line and the 0.482 µm. krypton ion laser line. In this embodiment, either argon or krypton lasers may be used to provide intense light sources. The transmission characteristics of a glass body are varied by the rare earth doped photochromic glasses of the instant invention which form the body.

Also, in accordance with the present invention erbium doped glasses have shown a reduction of absorption characteristics with optical pumping in the ground state absorption bands in the vicinity of the 0.520 µm. and 0.652 µm. wavelengths. This decrease in absorption may be referred to as the ground state deabsorption. In distinction thereto, neither of the uranyl or copper glasses have shown ground state deabsorption effects at these wavelengths.

Further, additional narrow excited state absorption bands have been shown to exist from 0.450 µm. to 0.838 µm.

Accordingly, a primary object of the present invention is to provide a device which exhibits excited state absorptions in narrow bands.

Another object is to provide a device for exhibiting a narrow band excited state absorption in the region of the spectrum wherein the output of usable laser materials is exhibited.

A further more specific object is to provide a device for use as a light modulator wherein excited state absorption is produced in a narrow band and the device further exhibits ground state deabsorption characteristics.

A still further object of the invention is to provide a device which exhibits excited state absorption in several additional distinctive narrow bands.

Further objects, advantages, and features of the invention will be apparent in the arrangement and construction of the constituent parts, in detail, as set forth in the following specification taken together with the accompanying drawing.

DESCRIPTION OF THE PREFERRED EMBODIMENTS

Figure 1:
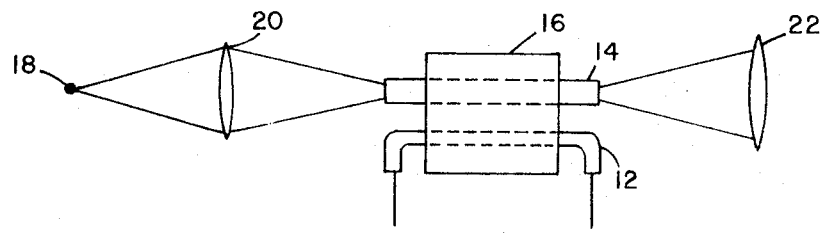
FIG. 1 is a diagrammatic representation of illustrative means for producing excited state absorption and ground state deabsorption in erbium glasses according to the present invention.

According to the present invention, it has been found that the trivalent erbium ion in a suitable glass produces excited state absorption bands which are set forth in Table I herebelow, and ground state deabsorption bands in the vicinity of 0.520 µm. and 0.653 µm. during and after optical pumping. A weak background excited state absorption is also found in the spectral region between 0.450 and 1.1 µm. The origin of this background excited state absorption may come from the base glass or color centers created in the base glass by the xenon flash tube. It is presently felt that it is caused by color centers. The background excited state absorption is much less than the strong trivalent erbium ion excited state absorption band at 0.479 μm. and is also less than most of the additional bands as well. The ground state deabsorption effects at 0.520 μm. and 0.653 μm. counteract the background excited state absorption at these same wavelengths. It has been found that if enough optical pumping is employed, the deabsorption effects become stronger than the background excited state absorption.

TABLE I

| Transition | Phosphate glass wavelength at— | | Silicate glass wavelength at— | |
|---|---|---|---|---|
| | Peaks (μm.) | Δα(cm.⁻¹) | Peaks (μm.) | Δα(cm.⁻¹) |
| $^4I_{13/2} \rightarrow {}^2G_{7/2}$ | 0.464 | | 0.463–0.467 | |
| $^4I_{13/2} \rightarrow {}^2K_{15/2}$ | 0.472 | | 0.472 | |
| $^4I_{13/2} \rightarrow {}^2G_{9/2}$ | 0.478 | | 0.480 | |
| $^4I_{13/2} \rightarrow {}^4G_{11/2}$ | 0.500–0.506 | | 0.500–0.509 | |
| $^4I_{13/2} \rightarrow {}^2H_{9/2}$ | 0.554 | | 0.556 | |
| $^4I_{13/2} \rightarrow {}^4F_{5/2}$ | 0.638 | 0.03 | 0.640 | 0.035 |
| $^4I_{13/2} \rightarrow {}^4F_{7/2}$ | 0.713 | ≈0.02 | 0.715 | ≈0.0225 |
| $^4I_{13/2} \rightarrow {}^2H_{11/2}$ | 0.790 | ≈0.025 | 0.787 | 0.035 |
| $^4I_{13/2} \rightarrow {}^4S_{3/2}$ | 0.838 | ≈0.01 | 0.845 | 0.01 |

In addition, an absorption band exists which corresponds to the transition of erbium ions from the $^4I_{13/2}$ energy level to the $^4F_{3/2}$ energy level. However, the band is at least an order of magnitude weaker than those shown in Table I.

It has also been found that the addition of trivalent ytterbium to the glass increases the strength of the excited state absorption and the ground state deabsorption in the trivalent erbium ions when pumping is accomplished with a xenon flash tube. The trivalent ytterbium ion strongly absorbs the pump light in the region between 0.88 and 0.98 μm. and transfers part of this energy to the trivalent erbium ion thereby improving the pumping efficiency for these wavelengths.

The presence of trivalent neodymium ions in the glass will also increase the pumping efficiency of the trivalent erbium by a xenon flash tube. In this case, the trivalent neodymium ion has many absorptions in the violet, visible and near infra-red (to about 0.89 μm.) which can absorb energy from the pump light with this energy being transferred from the trivalent neodymium to the trivalent ytterbium and then to the trivalent erbium. This energy transfer is further described in United States patent application Ser. No. 420,270 filed Dec. 22, 1965, now U.S. Pat. 3,533,956, "Laser Composition," inventor Elias Snitzer, which is copending herewith and assigned to the same assignee as the present application.

Samples of the compositions in wt. percent, of various types of erbium glasses are shown in Table II below:

TABLE II

| | A | B | C | D | E | F | G |
|---|---|---|---|---|---|---|---|
| $Er_2O_3$ | 1.00 | 0.50 | 1.00 | 1.00 | 0.50 | 1.00 | 0.68 |
| $Yb_2O_3$ | | 15.00 | 15.00 | 10.50 | 14.90 | 15.00 | 6.82 |
| $Nd_2O_3$ | | | 0.25 | 0.25 | 0.20 | 0.10 | |
| $SiO_2$ | 65.00 | 59.62 | 59.16 | 62.30 | | 59.26 | |
| $P_2O_5$ | | | | | 61.30 | | |
| $GeO_2$ | | | | | | | 74.74 |
| $Na_2O$ | 10.17 | 6.42 | 6.35 | 6.70 | | 6.36 | 4.59 |
| $LiO_2$ | | 0.89 | 0.88 | 0.93 | | 0.88 | 0.63 |
| $K_2O$ | 8.93 | 9.72 | 9.61 | 10.12 | | 9.62 | 6.94 |
| $CaO$ | 9.65 | | | | | | |
| $BaO$ | | 4.28 | 4.23 | 4.47 | | 4.24 | 3.05 |
| $ZnO$ | 2.91 | 1.34 | 1.32 | 1.40 | 14.66 | 1.33 | 0.96 |
| $Al_2O_3$ | 1.99 | 1.34 | 1.32 | 1.40 | 8.44 | 1.33 | 0.96 |
| $Sb_2O_3$ | 0.35 | 0.89 | 0.88 | 0.93 | | 0.88 | 0.63 |

The above compositions are only typical. It is to be understood that the concentrations, in wt. percent of the rare earth oxides in these glasses can be varied as indicated below:

$Er_2O_3$ — 0.1–10
$Yb_2O_3$ — 0–70
$Nd_2O_3$ — 0–10

Suitable additives for improving the glass quality or for altering its index of refraction or for changing any other property of the glass can be included. It is to be understood that the invention resides in a device, which device is capable of varying the transmission characteristics of an erbium doped glass in reference to an incoming stream of light. The invention utilizes the excited state absorption characteristics of the $Er^{3+}$ ions within the host. The composition of the particular host forms no part of the instant invention. The controlling requirement for the host is that it be doped with active ions, which ions exhibit excited state absorption. In accordance with the instant invention it has been discovered that erbium ions exhibit such excited state absorption and that these ions can vary the transmission characteristics of the host material. Numerous prior art erbium doped materials produce operative results when incorporated in the disclosed photochromic device.

FIG. 1 represents an illustrative embodiment of a means for producing excited state absorption and ground state deabsorption. The light from the xenon flash tube 12 is absorbed by rod 14, which rod is a trivalent erbium doped material. A portion of rod 14 and a flash tube 12 are enclosed within a cavity 16. The pumping light is likewise absorbed by trivalent ytterbium and/or trivalent neodymium if these dopants are present in the rod 14 in accordance with known prior art energy transfer schemes. The pumping light populates the metastable $^4I_{13/2}$ state of the trivalent erbium ion which has a relatively long lifetime of approximately 14 milliseconds. During the time that ions are in that level, they can be re-absorbed into higher energy levels of the trivalent erbium ion. The transition to one of these higher energy levels is quite strong and produces the 0.479 μm. excited state absorption band in the host. Similar transitions produce the other excited state absorption bands of the previous TABLE I. The presence of the excited ions in the metastable $^4I_{13/2}$ state decreases the population of the ground state thereby causing a decrease in the absorptions produced by transitions from the ground state resulting in the previously-mentioned ground state deabsorption bands. This deabsorption effect is strongest in the wavelength regions of high absorption (approximately 0.520 and 0.653 μm. with erbium ions). Any of the ground state absorptions of erbium can be used for this deabsorption effect. Although the example of FIG. 1 shows a xenon flash tube as the pump source, it should be understood that any other source whose wavelengths correspond to the pumping bands of the pertinent ions in the glass, can be used as a pump for the effects described.

Referring now to FIG. 1, a light source 18 is shown. The effective intensity of the source 18 is varied by a variation in the transmission characteristics of the rod 14. The light source 18 is directed through a lens 20 which focuses the light onto the rod 14. In order to facilitate the focusing of the source 18, the rod 14 extends partially through the cavity 16. The output is observed through a lens 22. In this embodiment the light source 18, as was previously stated, can be an argon or krypton ion laser since the 0.479 μm. excited state absorption band overlaps the 0.476 and 0.482 μm. regions.

The light T transmitted through a glass sample can be expressed approximately as shown below:

$$T = IKe^{-\alpha t}$$

wherein I is the incident light intensity, K is the attenuation factor for the reflection losses at the glass surfaces, α is the unpumped absorbance, and $t$ is the thickness of the glass. When the glass is pumped, the absorbance changes from α to (α+Δα), and if the light wavelengths being transmitted through the glass correspond to the excited state absorption, Δα is positive. If the light wavelengths correspond to a ground state deabsorption, Δα is negative.

Figure 2:
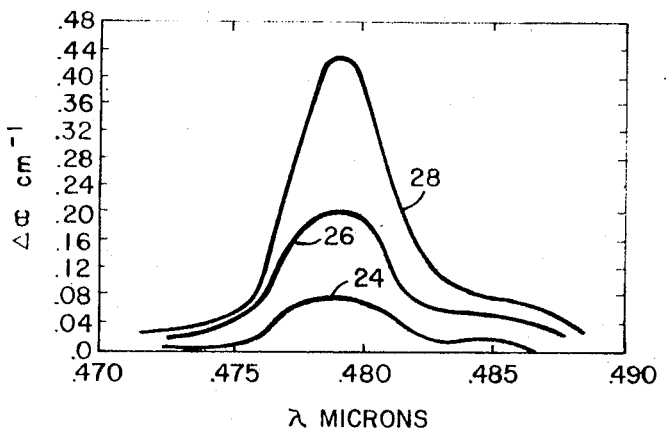
FIG. 2 is a plot of the excited state absorbance in a group of erbium glasses as a function of the wavelength in the region from 0.470 to 0.490 µm. wavelengths.

The values of Δα as a function of wavelength for the wavelength region surrounding the 0.479 μm. excited state absorption band in typical erbium 24, erbium-ytterbium 26, and erbium-ytterbium-neodymium 28 glasses are shown in FIG. 2. It should be understood that the effects increase aproximately linearly with pump energy with the plot of FIG. 2 being produced with an energy input to the xenon flash tube pump of 270 joules.

Figure 3:
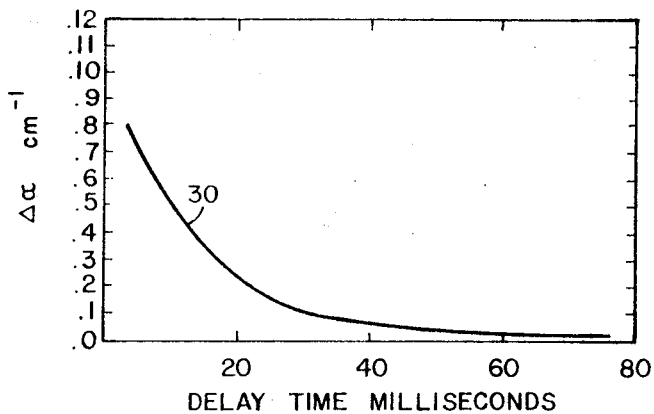
FIG. 3 is a plot of the excited state absorbance of an erbium glass with energy transfer, involving ytterbium and neodymium ions, as a function of time after the pump flash.

The plot 30 of FIG. 3 shows $\Delta\alpha$ at 0.479 $\mu$m. for the plot 28 as a function of time between the pump flash and the observation of the excited state absorption. A lifetime of about 15 milliseconds for the excited state absorption is shown by this plot.

Figure 4:
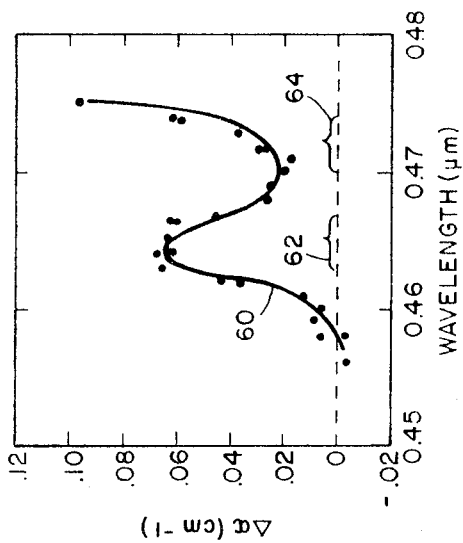

FIG. 4 shows a plot 60 of $\Delta\alpha$ as a function of wavelength for the region between 0.450 and 0.480 $\mu$m. This plot shows the transitions between the $^4I_{13/2}$ and the $^2G_{7/2}$ and $^2K_{15/2}$ energy levels. The general positions of the transitions are shown by the bracketed portions of the ordinates 62 and 64. These measurements were obtained using a rod of material corresponding to example composition F in Table II which was 76 mm. length and 6 mm. in diameter.

Figure 5:
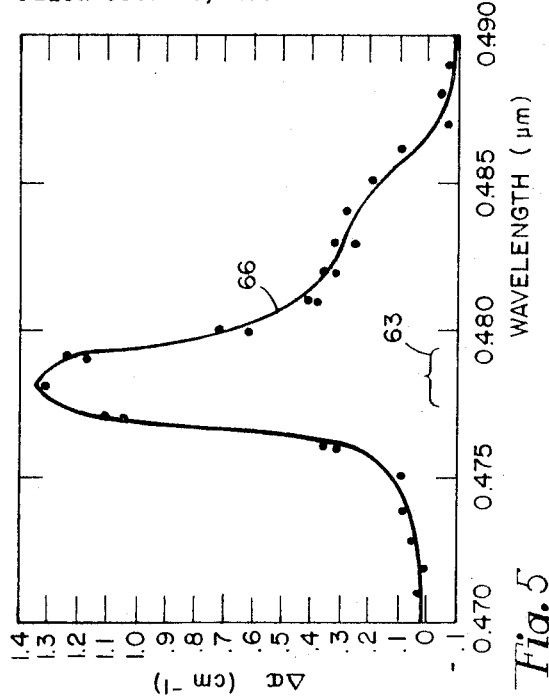
FIGS. 4–7 are a series of plots of the excited state absorbance of an erbium doped phosphate glass in the wavelength region from 0.45 to 0.57 µm.

FIG. 5 is a plot 66 of $\Delta\alpha$ as a function of wavelength for the region between 0.470 and 0.490 $\mu$m. and shows the excited state absorption band corresponding to the transition between the $^4I_{13/2}$ and the $^2G_{9/2}$ energy levels. The general position of this transition is shown by bracket 68. This measurement was made with the phosphate glass used for the measurement in FIG. 4; however, the rod was restricted to 25 mm. in length.

Figure 6:
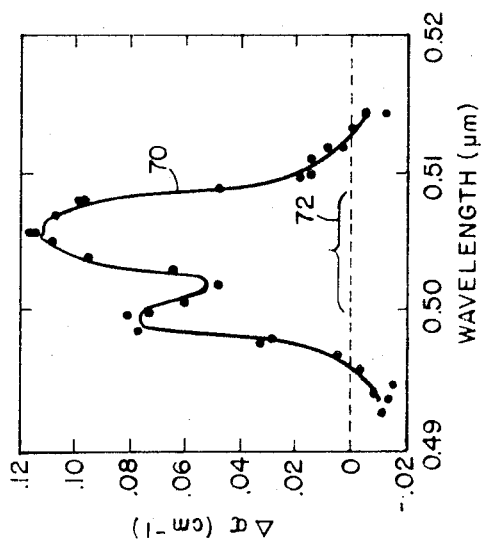

FIG. 6 is a plot 70 of $\Delta\alpha$ as a function of wavelength for the region between 0.490 and 0.520 $\mu$m. and was performed with the rod used for obtaining the results shown in FIG. 4. The plot 70 shows the excited state absorption band corresponding to the transition between the $^4I_{13/2}$ and $^4G_{11/2}$ energy levels and is represented by the general area covered by the bracket 72. It will be noted that this absorption band gives forth a double peak at 0.500 and 0.506 $\mu$m.

Figure 7:
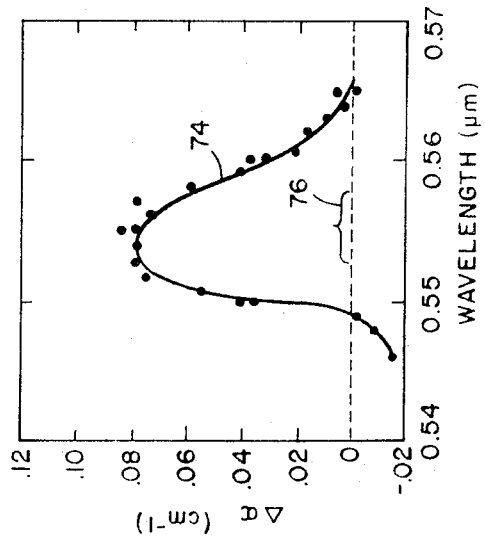

FIG. 7 is a plot 74 of $\Delta\alpha$ as a function of wavelength for the region between 0.540 and 0.570 $\mu$m. and was obtained with the phosphate glass rod utilized in the experiments whose results are shown in FIG. 4. The plot 74 shows the excited state absorption band corresponding to the transition between the $^4I_{13/2}$ and $^2H_{9/2}$ energy levels which is generally represented by the bracketed area 76.

Figure 8:
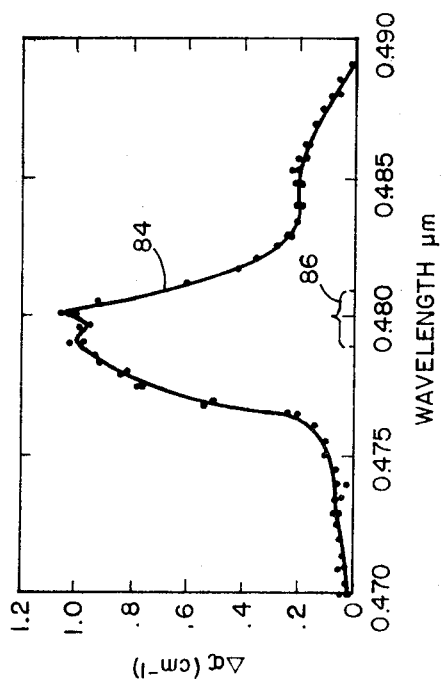
FIGS. 8–11 are a series of plots of the excited state absorbance of an erbium doped silicate glass in the wavelength region from 0.45 to 0.57 µm.

FIG. 8 is a plot 78 of $\Delta\alpha$ as a function of wavelength for the region between 0.450 and 0.480 $\mu$m. This measurement was obtained using an erbium doped silicate glass rod of the composition shown in Example F in Table II and was obtained with a rod 76 mm. in length and 6 mm. in diameter. The plot 78 shows the excited state absorption spectrum corresponding to the transitions from the $^4I_{13/2}$ to the $^2G_{7/2}$ and $^2K_{15/2}$ energy levels. The $^2G_{7/2}$ energy level is represented by the bracketed area 80 and as can be seen exhibits a double peak at 0.463 and 0.467 $\mu$m. The bracketed area 82 shows the general location of the $^4I_{13/2}$ to $^2K_{15/2}$ energy level transfer.

Figure 9:
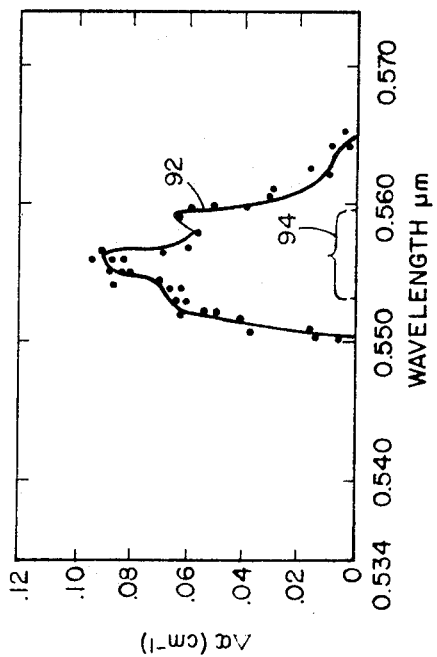

FIG. 9 is a plot 84 of $\Delta\alpha$ as a function of wavelength for the region between 0.470 and 0.490 $\mu$m. and was obtained with the glass composition utilized in the apparatus for obtaining the results shown in FIG. 8 except that the rod was restricted to 25 mm. in length. The plot 84 shows the excited state absorption spectra corresponding to the energy transfer between the $^4I_{13/2}$ and $^2G_{9/2}$ energy levels; the transition is represented by the area enclosed by the bracket 86.

Figure 10:
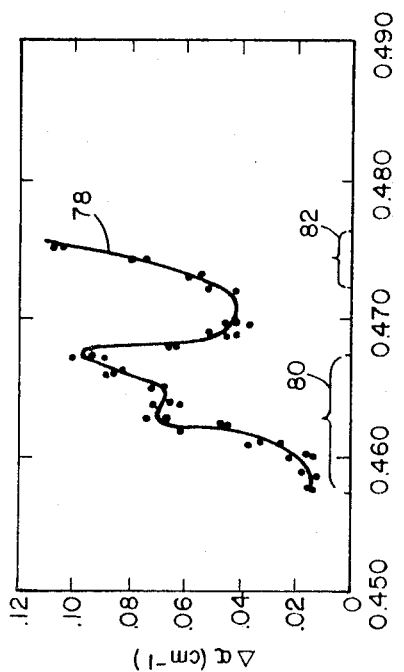

FIG. 10 is a plot 88 of $\Delta\alpha$ as a function of wavelength for the excited state absorption spectra in the wavelength region of 0.490 and 0.520 $\mu$m. and was obtained with the apparatus used for obtaining the results shown in FIG. 8. The plot 88 shows the excited state absorption spectra corresponding to the energy transfer from the $^4I_{13/2}$ energy level to the $^4G_{11/2}$ energy level. It will be noted that this transfer provides a double peak, the first of which is positioned at 0.500 $\mu$m. and the second of which is positioned at 0.509 $\mu$m.

Figure 11:
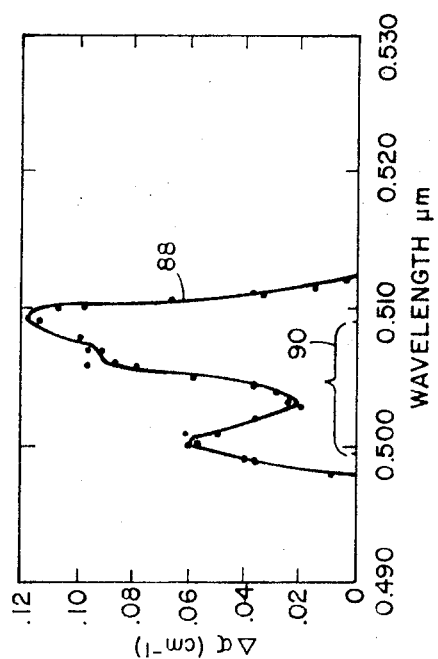

FIG. 11 shows a plot 92 of the excited state absorption spectra in the wavelength region from 0.540 to 0.570 $\mu$m. and was obtained with the rod used for obtaining the results shown in FIG. 8. The plot 92 represents the excited state absorption which corresponds to the transfer from the $^4I_{13/2}$ energy level to the $^2H_{9/2}$ energy level. The wavelength area corresponding to the absorption band corresponding to this transfer is represented by the bracket 94.

Figure 12:
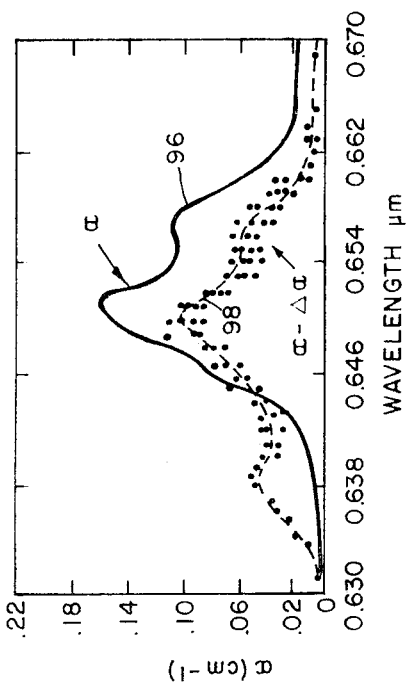
FIG. 12 is a plot of the deabsorption characteristics exhibited by the same glass as that used for FIGS. 4–7 versus wavelength in the region from 0.630 to 0.670 µm.

FIG. 12 shows a plot 96 of $\alpha$ and a plot 98 of $\alpha-\Delta\alpha$ as a function of wavelength for the ground state deabsorption between 0.630 and 0.670 $\mu$m. These plots were obtained with the erbium doped phosphate glass rod utilized to obtain the results shown in FIG. 4.

Figure 13:
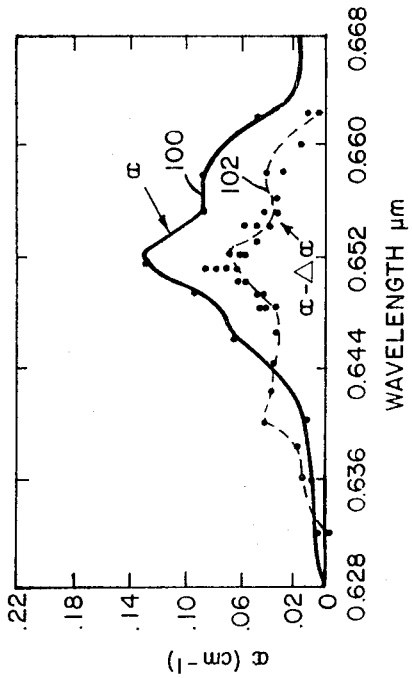
FIG. 13 is a plot of the deabsorption characteristics exhibited by the same glass as that used for FIGS. 8–11 versus wavelength in the region from 0.628 to 0.688 µm.

FIG. 13 shows a plot 100 of $\alpha$ and a plot 102 of $\alpha-\Delta\alpha$ as a function of wavelength for the ground state deabsorption between 0.628 and 0.688 $\mu$m. These plots were obtained with the erbium doped silicate glass rod utilized to obtain the results shown in FIG. 8.

Several additional excited state absorption bands were set forth in the above table; however, plots are not set forth herein for these bands exhibit a weak excited state absorption as shown by the maximum $\Delta\alpha$(cm.$^{-1}$) set forth in the tables for these bands.

The glasses described above would find application as a temporary image storing device, a light modulator, or a means for converting information in a beam of near infra-red light to information in a beam of light of a wavelength of approximately those shown in Table I above or of approximately 0.520 or 0.653 $\mu$m. When the glass is pumped by a source whose wavelength corresponds to all or some of the pumping absorption bands associated with the trivalent erbium, trivalent ytterbium, and/or trivalent neodymium ions in the glass, the previously mentioned excited state absorption bands are produced in the glass. The erbium-ytterbium combination is interesting because the strongest pump band is in the 0.88 to 1.0 $\mu$m. region. By directing light whose wavelengths lie within the 0.479 $\mu$m. excited state absorption band through the glass, the areas of excitation can be observed directly. In this manner, the absence or the presence and the intensity of the pumping radiation on a portion of this glass can be detected by observing the transmission of such violet light through the glass.

Figure 14:
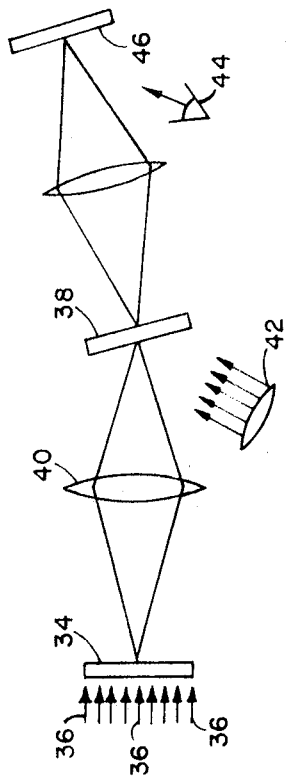
FIG. 14 is a diagrammatic representation of a means for recording an image and for reproducing this image with light having a wavelength corresponding to an excited state absorption or ground state deabsorption band using a plate of erbium material.

FIG. 14 shows an arrangement wherein an image of a mask or a photograph 34 is recorded with the pump light 36 on a plate 38 of one of the erbium glasses after being directed through a lens 40. For the glasses containing erbium-ytterbium, an infra-red source containing wavelengths between the 0.88 and 1.0 $\mu$m. region can be used to pump the erbium ions to an excited state. The image can be observed directly with an ultra-violet source 42 of a wavelength around 0.479 $\mu$m. with the observer 44 attentive to the projection on a projection screen or the like 46. In like manner, the source 42 may correspond to the wavelength of any of the other excited state absorption bands.

Figure 15:
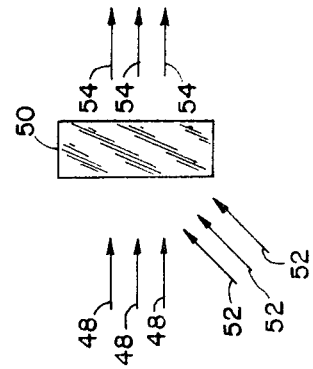
FIG. 15 is a diagrammatic representation of a device for modulating radiation having a wavelength corresponding to an excited state absorption or ground state deabsorption band with pump light and a modulator of erbium glass material.

The erbium glasses can also be used as a light modulator for the wavelengths mentioned above as shown in FIG. 15. In this case, that light 48 is directed through an erbium plate 50 along with pump light 52 which serves as the modulating light. This modulating light 52 for the erbium excited state absorption is incident upon the erbium plate 50 in such a manner so as to produce a sufficiently even spatial distribution of the excited state absorption. The excited state absorption which is controlled by the pump light 52 then modulates the light 48 to produce an output 54. The deabsorption effects in the erbium glasses can be employed in an embodiment similar to that used for the excited state absorption bands but with the sources in the regions of the 0.520 and 0.653 $\mu$m. deabsorption bands. In the deabsorption embodiments, the effect is reversed in that the transmission increases with optical pumping.

Thus by providing a device containing ions having the light absorption characteristics described above, an improved means for controlling the transmission of a stream of light results.

While there have been shown and described what are considered to be preferred embodiments of the present invention, it will be obvious to those skilled in the art that various changes and modifications may be made therein without departing from the invention.

We claim:

1. A light controlling device comprising a trivalent erbium doped body, means for introducing a stream of light onto the body, the intensity of which light is to be controlled as the stream of light is transmitted through the body, pumping means separate and distinct from the means for introducing a stream of light for raising electrons in the trivalent erbium to an energy level in which the trivalent erbium exhibits excited state absorption and further characterized in that the light, the intensity of which is to be controlled, is in a wave band with a peak position corresponding to a wave band of excited state absorption of the trivalent erbium ions.

2. The device as set forth in claim 1, wherein the stream of light originates from a laser chosen from the group consisting of an argon ion laser and a krypton ion laser.

3. The device as set forth in claim 1, wherein the stream of light originates from a krypton ion laser and is in a wave band with a peak position at approximately 0.482 μm.

4. The device as set forth in claim 1, wherein the stream of light originates from an argon ion laser and is in a wave band with a peak position at approximately 0.476 μm.

5. The device as set forth in claim 1, wherein the trivalent erbium doped body also includes trivalent ytterbium as a sensitizer for the trivalent erbium.

6. The device as set forth in claim 5, wherein the trivalent erbium doped body also includes trivalent neodymium as a sensitizer.

7. The device as set forth in claim 1, wherein the light to be controlled is in a wave band with an approximate peak position at a wavelength selected from the group consisting of 0.465 μm., 0.472 μm., 0.478 μm., 0.504 μm., 0.555 μm., 0.639 μm., 0.714 μm., 0.788 μm., and 0.842 μm.

8. An image recording device comprising a trivalent erbium doped photochromic body, pumping means for raising electrons in the trivalent erbium to an energy level in which the trivalent erbium exhibits excited state absorption, means for projecting an image onto the body with pumping light from the pumping means, which light source is directed on the body and is in a wave band with a peak position corresponding to the excited state absorption of the trivalent erbium ions and means for viewing the image resulting from the absorption of the light source by the trivalent erbium in the body.

9. The device as set forth in claim 8, wherein the trivalent erbium doped body also includes trivalent ytterbium as a sensitizer for the trivalent erbium.

10. The device as set forth in claim 9, wherein the trivalent erbium doped body also includes trivalent neodymium as a sensitizer.

11. A light controlling device comprising a trivalent erbium doped body, means for introducing a stream of light onto the body, the intensity of which light is to be controlled as the stream of light is transmitted through the body, pumping means separate and distinct from the means for introducing a stream of light for raising electrons in the trivalent erbium to an energy level in which the trivalent erbium exhibits ground state deabsorption and further characterized in that the light, the intensity of which is to be controlled is in a wave band with a peak position which corresponds to the trivalent erbium deabsorption bands.

12. The device as set forth in claim 11, wherein the light to be controlled is in a wave band with an approximate peak position at a wavelength selected from the group consisting of 0.520 μm. and 0.653 μm.

References Cited

UNITED STATES PATENTS

| | | | |
|---|---|---|---|
| 3,270,291 | 8/1966 | Kosonocky | 331—94.5 |
| 3,533,956 | 10/1970 | Snitzer | 331—94.5 |
| 3,243,723 | 3/1966 | Van Uitert | 331—94.5 |
| 3,250,721 | 5/1966 | De Paolis et al. | 331—94.5 |
| 3,269,847 | 8/1966 | Cohen | 350—160 P |

FOREIGN PATENTS

| | | | |
|---|---|---|---|
| 1,344,970 | 10/1963 | France | 331—94.5 |

OTHER REFERENCES

Snitzer et al.: "$Yb^{3+}$–$Er^{3+}$ Glass Laser" Applied Physics Letters, vol. 6; No. 3; pp. 45–6; Feb. 1, 1965.

RONALD L. WIBERT, Primary Examiner

V. P. McGRAW, Assistant Examiner

U.S. Cl. X.R.

350—160 R